Dec. 22, 1970
J. H. GERMER
3,549,494
FLOW MEASURING DEVICE FOR SODIUM-COOLED REACTORS
Filed Aug. 8, 1968
2 Sheets-Sheet 1
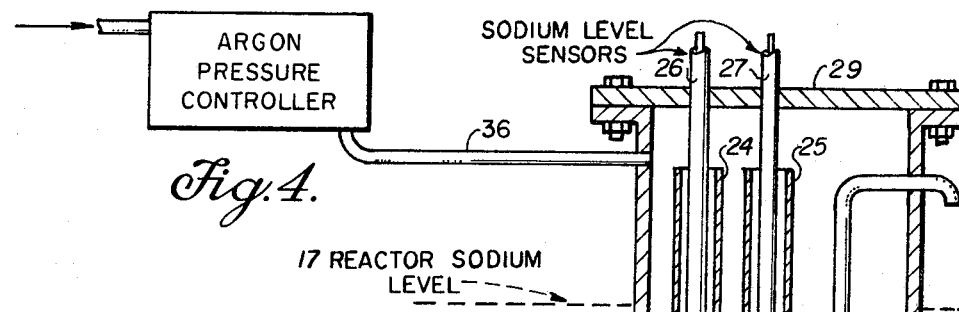
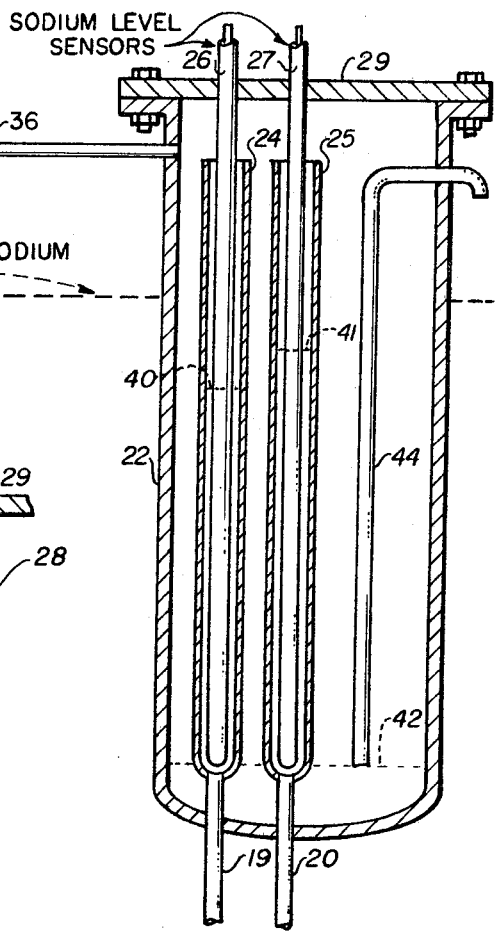
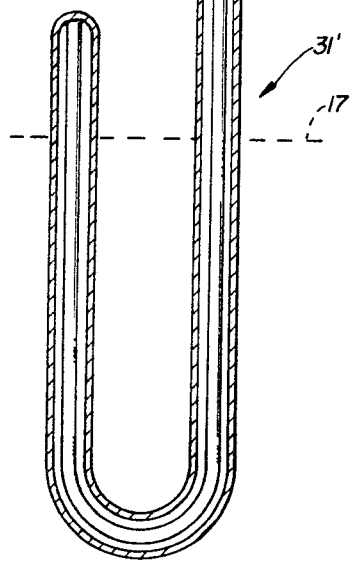
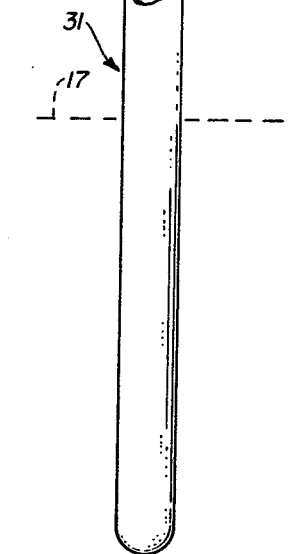
INVENTOR.
JOHN H. GERMER
BY
ATTORNEY United States Patent Office 3,549,494
Patented Dec. 22, 1970

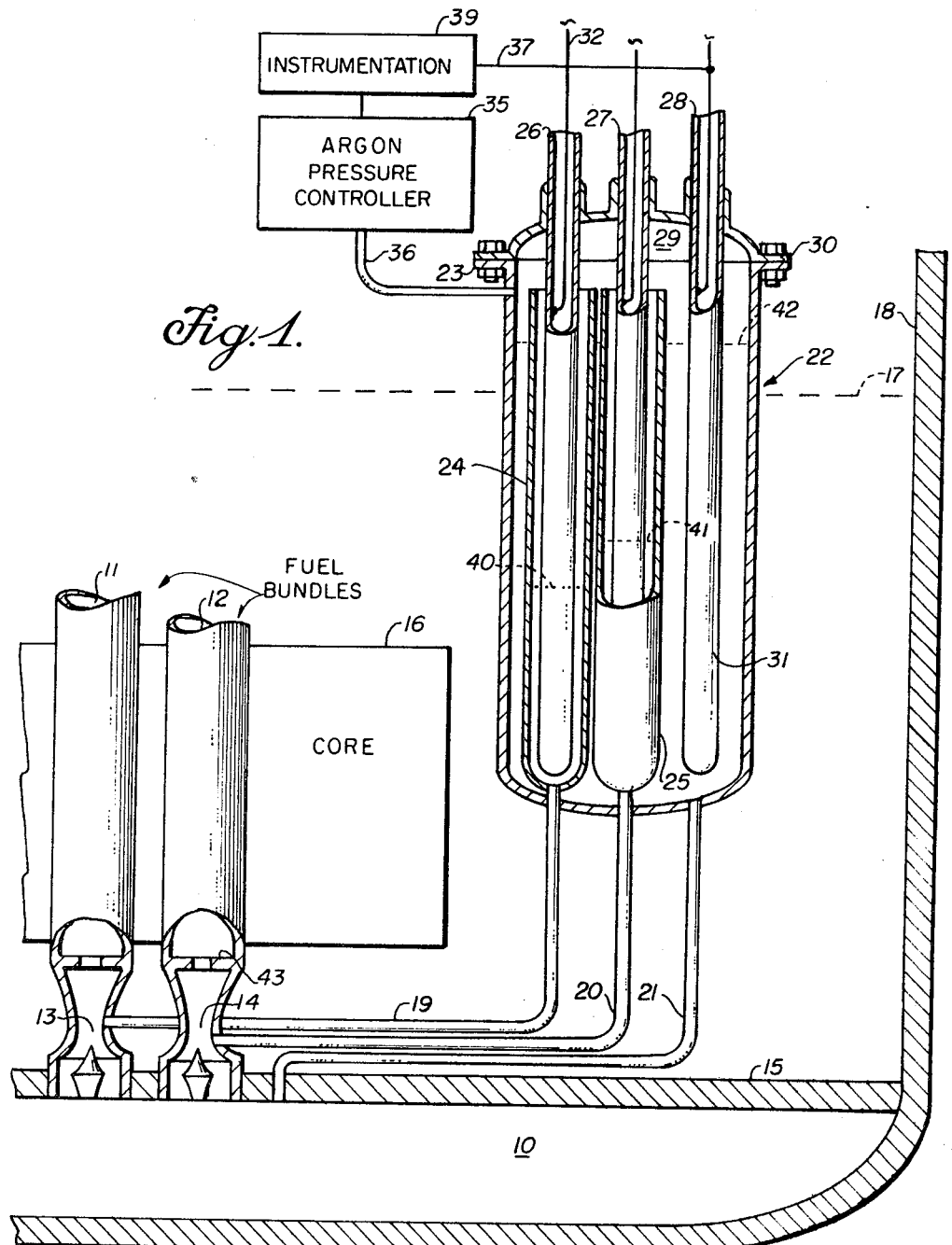

3,549,494
FLOW MEASURING DEVICE FOR SODIUM-COOLED REACTORS
John H. Germer, San Jose, Calif., assignor to the United States of America as represented by the United States Atomic Energy Commission
Filed Aug. 8, 1968, Ser. No. 751,246
Int. Cl. G21c 17/02
U.S. Cl. 176—19                10 Claims

ABSTRACT OF THE DISCLOSURE

An apparatus for measuring the coolant flow at the entrance of fuel bundles in a liquid sodium-cooled nuclear reactor. The apparatus works on the principle of a flow venturi transmitting a pressure signal to a differential manometer with electrical level sensors, and is constructed such that parts thereof requiring maintenance are readily accessible.

BACKGROUND OF THE INVENTION

The invention described herein was made in the course of, or under, Subcontract W–31–109–38–1997 under AEC Contract No. W–31–109–ENG–38 with the United States Atomic Energy Commission.

This invention is related to flow measuring devices, and more particularly to such a device for measuring the flow of coolant entering the fuel bundles located in the core of a nuclear reactor.

The prior art discloses various types of flow measuring devices applicable to numerous types of uses. However, no known prior flow measuring device has the capability of measuring the coolant flow in the fuel bundles of a reactor, particularly with the ease of maintenance provided by the present invention.

SUMMARY OF THE INVENTION

The present invention is directed to a device for measuring the coolant flow at the entrance of fuel bundles in a liquid sodium-cooled reactor and has the following primary advantages: (1) all electrical parts requiring maintenance are easily accessible, with other components being a permanent part of the reactor structure; (2) all small tubing and other components thereof in contact with the sodium operate at the same or higher temperature as the reactor inlet and are therefore not subject to plugging by sodium oxide; and (3) the tubes thereof can be easily flushed out periodically by raising the sodium level in the level sensing tank to above the tops of the tubes from the flow venturis.

Therefore, it is an object of this invention to provide a fluid flow measuring device.

A further object of the invention is to provide an apparatus for measuring coolant flow in the fuel bundles of a reactor core.

Another object of the invention is to provide a flow measuring apparatus particularly adapted for measuring the flow of liquid sodium entering the fuel bundles in the core of a sodium-cooled reactor.

Another object of the invention is to provide a flow measuring device which provides ease of maintenance for all portions thereof requiring periodic maintenance.

Another object of the invention is to provide a flow measuring device for a sodium-cooled reactor which operates at a sufficiently high temperature so as to eliminate plugging of components thereof by sodium oxide.

Other objects of the invention will become readily apparent from the following description and the accompanying drawings wherein:

BRIEF DESCRIPTION OF THE DRAWINGS

FIG. 1 is a diagrammatic view, partially in cross-section, of a portion of a nuclear reactor utilizing an embodiment of the invention;

FIG. 2 is an enlarged view of the sodium level sensors illustrated in FIG. 1;

FIG. 3 is a side view of another embodiment of a sodium level sensor which may be utilized in the FIG. 1 device; and FIG. 4 is a partial view of a modified embodiment of the FIG. 1 device.

DESCRIPTION OF THE EMBODIMENTS

As illustrated in FIG. 1, the flow of liquid sodium, indicated by the arrows, from reactor coolant inlet plenum 10 is sensed at the inlet of each of reactor fuel bundles 11 and 12 (only two being illustrated) by fixed flow venturi tubes 13 and 14, respectively. Each of the venturi tubes 13 and 14 are mounted as part of a reactor support plate 15 and forms part of the unit into which the fuel bundles 11 and 12 attach. As commonly known in the art, the fuel bundles 11 and 12 extend through a reactor core generally indicated at 16 which is surrounded by liquid sodium, the level of which is indicated at 17, and mounted in a reactor vessel 18. Pressure measuring tubes or conduits 19 and 20 are respectively connected to the throat of venturi tubes 13 and 14, while another pressure tube or conduit 21 is connected to the reactor inlet plenum 15. Tubes 19–21 connect to the bottom of a level sensing tank 22. The tank 22 is a permanent part of the reactor structure and is located at or near the sodium level 17 of the reactor vessel 18. Each of the tubes 19 and 20 terminates inside of the level sensing tank 22 at a point near a cover connection flange 23 at the upper end of the tank. The portions of tubes 19 and 20 within tank 22 are of an enlarged diameter and indicated at 24 and 25, respectively. Tube 21 terminates at the bottom of the tank 22 or at a lower portion thereof. Pressure measuring tubes 19–21 are sealed to the bottom of tank 22 such that fluid leakage is prevented.

Electrical sodium level sensors generally indicated at 26, 27 and 28 extend through and are secured to a removable cover 29 for level sensing tank 22, cover 29 including a flange 30 which abuts flange 23 of tank 22, with flanges 23 and 30 being secured together such as by bolts or other suitable means, not shown. Sensors 26 and 27, respectively, fit within the enlarged diameter portions 24 and 25 of the pressure measure tubes 19 and 20, for measuring sodium level within portions 24 and 25. Sensor 28 extends into the level sensing tank 22 for measurement of the sodium level therein. The sensors 26–28 (see FIG. 2) each consist of a closed end resistance tube 31 which may, for example, be constructed of stainless steel, and a lead wire or conductor 32, such as copper. Copper wires 32 are secured to the internal wall surface of resistance tube 31 and extends outwardly from the open upper end thereof for interconnection with appropriate instrumentation. Resistance tube 31 is secured to tank cover 29 via a collar-like member 33 of cover 29.

If desired, the compact sensor 26–28, as illustrated in detail in FIG. 2, may be replaced by a conventional J tube type sensor as illustrated in FIG. 3 and comprises a resistance tube 31' of stainless steel, for example, which is open at one end and closed at the opposite end, forming a J configuration therebetween, and a lead wire or conductor 32', such as copper, which is connected at one end thereof to the closed end of tube 31' and extends outwardly from the open end of the tube for interconnection with associated instrumentation, tube 31' being connected in an aperture 34 to tank cover 29. It should be noted that space is conserved by the use of the FIG. 2 sensor due to the substantially straight-line configuration of the tube 31 compared to the J configuration of the tube 31'.

As shown in FIG. 1, an argon pressure controller indicated generally 35 connects via conduit 36 to the upper part of the level sensing tank 22. Pressure controller 35 may be, if desired, connected via the tank cover 29. Argon pressure in the upper portion of tank 22 is controlled by controller 35 to maintain a prescribed sodium level 42 in the sensing tank as indicated by level sensor 28 via connections 37 through an instrumentation package 39. Since details for controlling mechanism such as the pressure controller 35 by sensor 28 are common in the art, and since these details do not constitute part of this invention, the above description thereof is deemed sufficient to provide an understanding of their function.

It should be noted that the pressure inside of the level sensing tank 22 will be that of the reactor inlet plenum 10, less the hydrostatic head caused by the elevation of tank 22 above plenum 10. The pressure outside of the tank 22 will be at the much lower reactor outlet pressure (the pressure within reactor vessel 18). It is possible to install the removable cover 29 of tank 22 with a leaky seal therebetween, provided that adequate flow capacity is incorporated in the argon control system. Also note that all components which might require servicing are connected to the removable cover 29.

In operation, indication of flow of sodium through venturi tubes 13 and 14 to fuel bundles 11 and 12, respectively, will be given by the measurement of depression in the sodium levels 40 and 41 in enlarged tube portions 24 and 25, respectively, at sensors 26 and 27. These can either be measured directly, or the sodium level about the sensors can be subtracted from the reading of the sodium level 42 in the level sensing tank 22 by sensor 28. The latter will compensate for errors or transients in the argon pressure controller 35, and will permit a deliberate cycling of sodium level to assure that none of the tubes 19–21 are plugged.

If the reactor fuel bundles 11 and 12 are orificed, as indicated at 43 to give different sodium coolant flows, it may be desirable to provide the orificed fuel bundles with flow venturi tubes of different sizes. This can allow equal sensitivity to all the sensors. As illustrated, the orifices 43 should be located after the venturi tubes 13 and 14.

The flow measuring device illustrated in FIG. 1 tends to sense a difference in level in the level sensing tank 22 that is of a very large magnitude. For example, if the flow velocity in the venturi 13 is assumed to be 30 ft./sec., the sensor 26 will measure a level drop of $V^2/2g=14$ ft. between that particular sensor and the level 42 in the tank 22. A variation of that magnitude would result in requiring that the level sensing tank be more than 14 feet in height.

One solution to the above problem would be to decrease the sensitivity of the venturi by either increasing its diameter, by providing a leakage bypass connection to the inlet plenum 10, or by changing the design of the venturi to include some flow impact effect.

A more attractive solution to the above problem is to retain the sensitivity of the original venturi, and eliminate the direct connection to the reactor inlet plenum 10, as illustrated in FIG. 4. The essential difference from the FIG. 1 embodiment is that this variation eliminates the tube 21 connecting level sensing tank 22 with the inlet plenum 10, and the sodium level 42 in tank 22 is eliminated. Tank 22 is provided with a drain tube 44 extending from adjacent the bottom of the tank and terminating in the side of the tank above the sodium level 17 in reactor vessel 18. The drain tube would remove any overflow from the individual tubes 24 and 25, since tank 22 normally operates with sodium in the inside of the tubes 24 and 25 only, in this variation. The argon pressure in tank 22 is now controlled by the sodium level 40 and 41 inside the tubes 24 and 25. The advantage of the FIG. 4 embodiment is that the overall height of the level sensing tank 22 will need only to be as high as the maximum difference in the sensed venturi pressure heads. In order to minimize this difference, the fuel bundle orifices 43 are placed above the venturi tubes 13 and 14, and the diameters of the venturi tubes varied such that they all will have approximately the same flow velocity.

While the FIG. 4 embodiment does not provide a direct reading of absolute flow in the individual channels, it does provide a very sensitive indication of variations in flow. For example, assuming 30 ft./sec. nominal velocity, a flow decrease of 0.3% will raise the level in the tubes 24 or 25 by one inch, an easily detectable difference. However, if an absolute value of flow is desired, it can be obtained by also measuring by conventional means the pressure of the argon gas in the level sensing tank 22 and comparing this with the pressure in the inlet plenum 10.

Another desirable feature of the inventive system would be an interconnection between the scram system of the reactor and the argon pressure controller 35 to dump this gas pressure to the reactor cover gas. This prevents the possibility of forcing argon into the fuel bundle entrances in the event of either a sudden overall flow stoppage, or a sudden increase in flow to a single fuel bundle (caused, for example, by a failure of the lower end of the fuel bundle or its support).

It has thus been shown that the present invention provides a flow measuring apparatus for sodium-cooled reactors which has the following advantages: (1) all electrical parts requiring maintenance are easily accessible with other components being a permanent part of the reactor structure; (2) since all small tubing and other sodium components operate at the same or higher temperature as the reactor inlet, they are not subject to plugging by sodium oxide; and (3) the tubes can be easily flushed out periodically by raising the sodium level in the level sensing tank to above the tops of the tubes from the flow venturi tubes.

While particular embodiments of the invention have been illustrated and described, modifications and changes will become apparent to those skilled in the art, and it is intended to cover in the appended claims, all such modifications and changes as come within the spirit and scope of the invention.

I claim:
1. An apparatus for measuring coolant flow at the entrance of fuel bundles in a sodium-cooled nuclear reactor comprising: a level sensing tank adapted to be mounted in a reactor pressure vessel, said tank including a removable cover means, at least one sodium level sensor operatively mounted in said removable cover means and adapted to indicate the level of sodium within said tank, pressure controlling means connected to said tank and adapted to maintain a prescribed sodium level within said tank, means connecting said tank with a reactor coolant inlet plenum, at least one venturi tube in fluid communication with said inlet plenum and adapted to be connected with an associated fuel bundle for supplying sodium coolant to such an associated fuel bundle, means interconnecting said venturi tube with said tank, and sodium level sensing means operatively mounted in said removable cover means and adapted to indicate the level of sodium within said interconnecting means.

2. The apparatus defined in claim 1, wherein said pressure controlling means includes an argon pressure connected to an upper portion of said level sensing tank.

3. The apparatus defined in claim 2, wherein said pressure controlling means additionally includes instrumentation interconnecting said sodium level sensor with said argon pressure controller, whereby argon pressure in said tank is controlled to maintain the prescribed sodium level within said tank in response to indication of said sodium level sensor.

4. The apparatus defined in claim 1, wherein said connecting means comprises a tube-like member connected to a lower portion of said level sensing tank and to said reactor inlet plenum via an aperture in a reactor support plate means separating said inlet plenum from said tank.

5. The apparatus defined in claim 1, wherein said interconnecting means comprises a tube-like member connected to a lower portion of said level sensing tank, and including an enlarged portion located within said tank, said sodium level sensing means extending into said enlarged portion of said tube-like member and adapted for indicating the level of sodium therein.

6. The apparatus defined in claim 1, wherein said sodium level sensor and said sodium level sensing means each comprise a resistance tube closed at one end, and a conductor extending into and operatively connected at one end thereof to said resistance tube.

7. The apparatus defined in claim 6, wherein said resistance tube is of a substantially straight-line configuration, and said one end of said conductor is connected to a side wall of said resistance tube.

8. The apparatus defined in claim 6, wherein said resistance tube is of a J configuration, and said one end of said conductor is connected to said closed end of said resistance tube.

9. The apparatus defined in claim 1, wherein said venturi tube is provided with at least one orifice positioned downstream from the throat thereof.

10. The apparatus defined in claim 1, in combination with a reactor core positioned within said reactor pressure vessel and containing a plurality of fuel bundles therein, each of said fuel bundles being connected with said reactor coolant inlet plenum through one of said venturi tubes, said reactor pressure vessel containing liquid sodium to a level sufficient to cover said reactor core, said level sensing tank being positioned in said pressure vessel such that at least a portion there of extends above the level of sodium within said pressure vessel, each of said venturi tubes being connected to said tank by one of said interconnecting means, each of said interconnecting means being provided with one of said sodium level sensing means which is operatively mounted in said removable cover means for indicating sodium level within said interconnecting means.

References Cited

UNITED STATES PATENTS

| | | | |
|---|---|---|---|
| 2,391,060 | 12/1945 | MacKay | 137—100 |
| 2,886,968 | 5/1959 | Johnson et al. | 73—213 |
| 3,251,226 | 5/1966 | Cushing | 73—205 |
| 3,371,530 | 3/1968 | Howe | 73—205 |
| 3,501,377 | 3/1970 | Germer | 176—19 |

REUBEN EPSTEIN, Primary Examiner

U.S. Cl. X.R.

73—213, 205; 137—100